July 21, 1925.
P. E. ATWATER
1,546,358
METHOD OF SECURING VALVE STEMS TO HEADS
Filed Dec. 1, 1924
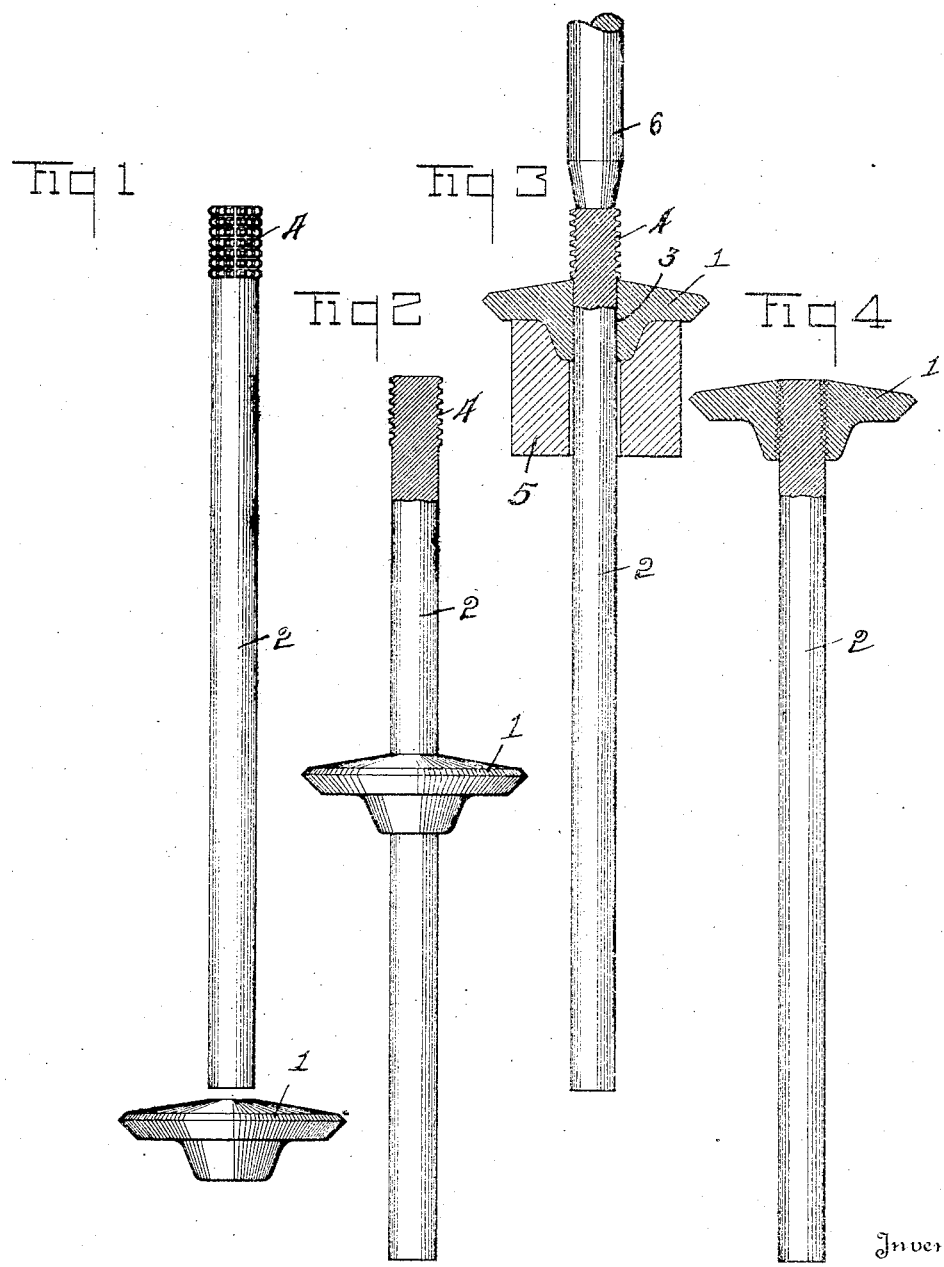
Inventor
Paul E. Atwater,
By Owen Owen & Crampton,
Attorneys Patented July 21, 1925.

1,546,358

UNITED STATES PATENT OFFICE.

PAUL E. ATWATER, OF TOLEDO, OHIO, ASSIGNOR TO THE TOLEDO STEEL PRODUCTS COMPANY, OF TOLEDO, OHIO, A CORPORATION OF OHIO.

METHOD OF SECURING VALVE STEMS TO HEADS.

Application filed December 1, 1924. Serial No. 753,024.

*To all whom it may concern:*

Be it known that I, PAUL E. ATWATER, a citizen of the United States, and a resident of Toledo, in the county of Lucas and State of Ohio, have invented a new and useful Method of Securing Valve Stems to Heads, which invention is fully set forth in the following specification.

This invention relates to the manufacture of poppet valves and the like, and particularly to the method of securing the valve heads and stems together.

It has been the practice to rigidly connect the heads and stems of valves by electric welding, and in order to effect a more perfect union between the parts at the point of weld it has been customary to provide an initial threaded connection therebetween. It is found, however, with this and other methods heretofore employed in connection with the welding of such parts, that an entirely satisfactory joint is not obtained, and the object of the present invention is to so treat and intimately connect the parts before welding that a highly effective and durable weld is obtained, thereby increasing the practicability and commercial value of such valves.

The invention is fully described in the following specification, and an illustration of one embodiment thereof and of the steps in the method employed are illustrated in the accompanying drawings, in which,—

Figure 1 designates the head of the valve stem in separated relation with the stem in the act of being inserted through the head opening and with its head securing end roughened in accordance with the invention. Fig. 2 is a similar view with the stem partly threaded through the head and with the roughened end of the stem in connection. Fig. 3 shows the roughened portion of the stem in the act of being forced into the head opening with the head, a portion of the stem and the head supporting member in section, and Fig. 4 is an elevation of the completed valve with the head end thereof in section to indicate the weld between the parts.

Referring to the drawings, 1 designates the head of a valve of the poppet type, and 2 the stem therefor.

In carrying out the invention, the head is provided with an opening 3 axially therethrough adapted to freely fit the stem for sliding movements thereon and the stem end, to which the head is to be welded, knurled or otherwise suitably fashioned or acted on to form a roughened surface 4 entirely around the stem and of a length substantially equal to the length of the head opening 3.

The roughened surface 4 is preferably composed of a plurality of small projections formed, in the present instance, by providing a stem surface with a succession of circumferential and a succession of longitudinal cuts or recesses, the forming of which forces the metal out so that said projections extend beyond the normal surface of the stem and render the roughened surface slightly larger in diameter than the stem body and the head opening 3. This difference in diameter of the stem surface 4 of the head opening requires the application of pressure to force one within the other and to effect the necessary reduction in size of the roughened surface to accommodate itself to the opening. The force required for this purpose causes the projections to be reduced in size and to dig into the wall of the head opening, thereby providing a quite rigid intimate connection between the head and stem which materially facilitates welding and the forming of a strong, durable and integral union between the parts, for it is found that the more intimate the connection between the parts before welding the more perfect is the weld. The welded union, which is thus effected between the parts, is superior to the union effected between joints of threaded or other form heretofore used preparatory to the welding operation. Fig. 3 illustrates a force applying means of which 5 is the head support and 6 a plunger for forcing the stem into the head.

It is evident that the method employed consists in providing the stem with a roughened surface having a plurality of projections and being of slightly greater diameter than the head opening, forcing the roughened portion of the stem into the head opening to effect an intimate engagement of the projections of roughened surface with the wall of the head opening and then electrically welding the joint between the head and stem thus formed.

I wish it understood that my invention is not limited to any specific construction, arrangement or form of the parts, or to the particular method described, as it is capable of numerous modifications and changes without departing from the spirit of the claims.

Having thus described my invention what I claim as new and desire to secure by Letters Patent is:

1. The method of securing valve heads and stems together, consisting in providing the stem with a roughened portion of slightly greater diameter than the head opening, forcing the roughened portion of the stem into the head opening by axial pressure to effect an intimate joint between the two, and then electrically welding the joint thus formed.

2. The method of securing valve heads and stems together, consisting in providing the stem entirely around an end portion thereof with a surface of knurled form which is of slightly greater diameter than the head opening, inserting the stem thru the head and applying axial pressure thereto to force the knurled portion of the stem into the head opening to cause the knurled surface projections to dig into the wall of the head opening and form a substantially rigid intimate connection therebetween, and then electrically welding the joint thus formed.

In testimony whereof, I have hereunto subscribed my name to this specification.

PAUL E. ATWATER.